(12) United States Patent
Itoga et al.

(10) Patent No.: US 7,898,914 B2
(45) Date of Patent: Mar. 1, 2011

(54) OPTICAL DISK RECORDING APPARATUS AND METHOD OF FORMING VISIBLE IMAGE ON OPTICAL DISK

(75) Inventors: Hisanori Itoga, Hamamatsu (JP); Seiya Yamada, Shimada (JP); Tatsuo Fushiki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1279 days.

(21) Appl. No.: 11/477,780

(22) Filed: Jun. 30, 2006

(65) Prior Publication Data

US 2007/0002385 A1 Jan. 4, 2007

(30) Foreign Application Priority Data

Jun. 30, 2005 (JP) ............................. 2005-191234

(51) Int. Cl.
*G11B 7/24* (2006.01)
(52) U.S. Cl. ................ 369/47.4; 369/47.22; 369/44.26; 347/224
(58) Field of Classification Search .............. 369/47.22, 369/44.28, 44.26, 30.04, 53.29, 47.4, 53.12; 347/253, 224, 229, 251, 240, 262, 225
See application file for complete search history.

(56) References Cited

U.S. PATENT DOCUMENTS

| | | | |
|---|---|---|---|
| 5,974,013 A * | 10/1999 | Kadono | 369/47.49 |
| 6,259,666 B1 | 7/2001 | Kobayashi et al. | |
| 6,512,535 B1 * | 1/2003 | Nagasaka et al. | 347/240 |
| 6,532,034 B2 * | 3/2003 | Hirotsune et al. | 347/229 |
| 6,844,889 B2 * | 1/2005 | Bronson | 347/224 |
| 7,015,939 B2 * | 3/2006 | Honda et al. | 347/225 |

(Continued)

FOREIGN PATENT DOCUMENTS

EP 1 308 938 A2 5/2003

(Continued)

OTHER PUBLICATIONS

Extended European Search Report dated May 11, 2009 (Five (5) pages).

(Continued)

*Primary Examiner*—Hoa T Nguyen
*Assistant Examiner*—Kim-Kwok Chu
(74) *Attorney, Agent, or Firm*—Crowell & Moring LLP

(57) ABSTRACT

An optical disk is equipped with a predetermined mark. A frequency generator outputs an FG pulse of frequency corresponding to the rotational speed of a spindle motor used for rotationally driving the optical disk. The edge of the FG pulse detected by an edge detection section is counted by an FG counter. An angle counter measures the duration of a time from appearance of an edge of the FG pulse until a point in time when the mark affixed to the optical disk 1 is detected. A count value of the FG counter, which has been acquired at the point in time when the mark is detected, and a count value of the angle counter are saved. In a case where a visible image is rendered, encoding of a visible image to be rendered is started when the count value of the FG counter and the count value of the angle counter have become equal to the respective saved values.

6 Claims, 6 Drawing Sheets

U.S. PATENT DOCUMENTS

| | | |
|---|---|---|
| 7,129,968 B2 * | 10/2006 | Morishima .................. 347/253 |
| 7,298,389 B2 * | 11/2007 | Hayashi ..................... 347/225 |
| 2002/0030705 A1 | 3/2002 | Youngberg et al. |
| 2004/0057356 A1 | 3/2004 | Morishima |
| 2004/0062179 A1 | 4/2004 | Tsurumi et al. |
| 2004/0141046 A1 | 7/2004 | Hanks |

FOREIGN PATENT DOCUMENTS

| | | |
|---|---|---|
| JP | 2002-203321 A | 7/2002 |
| JP | 2002-203321 A | 7/2002 |
| JP | 2003-16649 A | 1/2003 |
| JP | 2003-16649 A | 1/2003 |
| JP | 2003-203348 A | 7/2003 |
| JP | 2004-39019 A | 2/2004 |
| JP | 2004-39019 A | 2/2004 |
| WO | WO 2004/042729 A1 | 5/2004 |

OTHER PUBLICATIONS

Decision to Grant a Patent draft date Jul. 2, 2007 including English translation of pertinent portion (Four (4) pages).

* cited by examiner

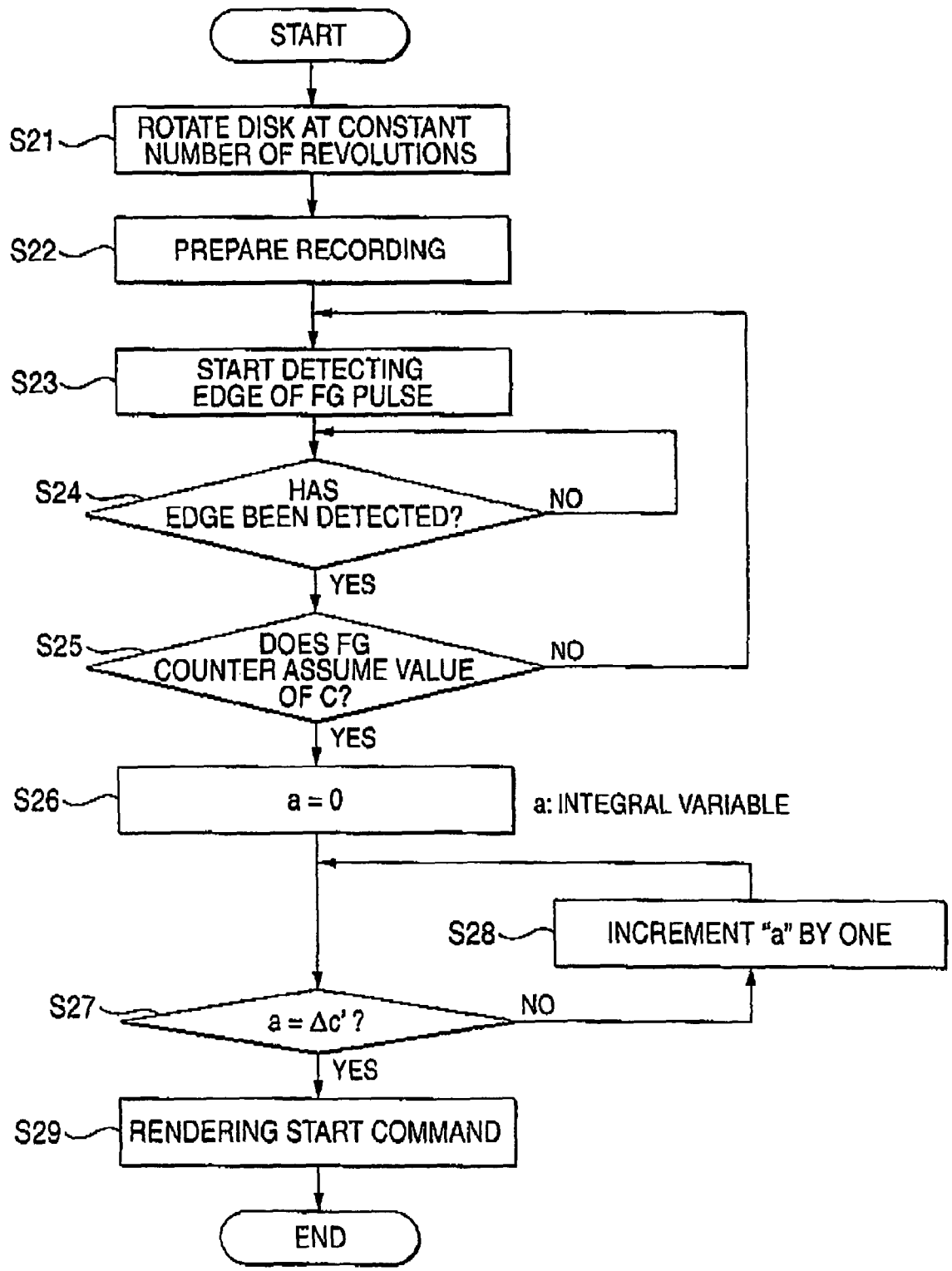

OPTICAL DISK RECORDING APPARATUS AND METHOD OF FORMING VISIBLE IMAGE ON OPTICAL DISK

BACKGROUND OF THE INVENTION

The present invention relates to an optical disk recording apparatus which forms a visible image on a disk surface of an optical disk, such as a CR-R/RW, a DVD+R/RW, or a DVD-R/RW, by use of a laser, and a method of forming the visible image on the optical disk.

Recording a visible image, such as characters or graphics, on a recording surface of an optical disk or a label surface (a surface opposite the recording surface) of the same by use of a laser has been known.

For instance, Patent Document 1 proposes a technique of providing a visible light characteristic changing layer at a position which is viewable from a label surface side of an optical disk; and exposing the visible light characteristic changing layer to a laser beam to thus change a visible light characteristic of the layer and render a visible image.

Patent Document 2 proposes a technique of using a reversible phase change material for a recording film of an optical disk, which enables recording of a visible image by use of a laser, and rewriting recorded graphics.

Patent Document 3 proposes a technique of newly writing a visible image on a recording surface of an optical disk on which a visible image has already been recorded.

Patent Document 1: JP-A-2002-203321

Patent Document 2: JP-A-2003-016649

Patent Document 3: JP-A-2004-039019

Patent Document 3 describes a technique of utilizing an FG pulse signal representing the rotational frequency of a spindle motor when a visible image is recorded on a disk surface of an optical disk, and taking as a reference pulse an FG pulse which is acquired at a timing when a specific address has been detected, and detecting a position radiated by a laser beam while taking the reference pulse as a reference.

When the optical disk on which the visible image has been rendered is taken out of the recording apparatus and the optical disk is again set to render a visible image, control is performed such that the number of FG pulses acquired during one revolution of the optical disk is increased so that positioning can be performed with high accuracy (Paragraph 0073 in Patent Document 3).

However, when an angle is detected while the FG pulse is taken as a reference, an error in detection of an angle becomes greater. For instance, when eight FG pulses are output per one revolution of the spindle, a maximum error in detection of an angle is 360/8=45 [deg.].

Moreover, in order to diminish the error in detection of an angle, the number of FG pulses per revolution of the spindle must be increased as mentioned above. However, an increase in the number of FG pulses usually results in a cost hike.

SUMMARY OF THE INVENTION

Accordingly, the present invention aims at providing an optical disk recording apparatus and a method capable, when rendering of an image or the like on a recording surface or a label surface of the optical disk, of splicing rendering of an image at a predetermined position in a visually-smooth manner with reference to an image which has already been formed on the optical disk even when the optical disk is taken out of a drive after having been subjected to rendering and recording and when the optical disk is again inserted into the drive.

In order to achieve the above object, the present invention is characterized by having the following arrangement.

(1) An optical disk recording apparatus for forming a visible image on an optical disk in which one tangential direction of the optical disk is determined as a reference angle positions the optical disk recording apparatus comprising:

a rotating unit that holds and rotates the optical disk;

an angle signal output unit that outputs a pulse signal of a frequency responsive to rotation of the rotating unit;

a reference angle position detector that detects the reference angle position of the optical disk based on an optical signal returned from the optical disk;

a first counter that counts the number of edges of the pulse during one revolution as a count value;

a second counter that measures a time which elapses from one edge to a next edge of the pulse as a measurement value;

a saving unit that saves the count value acquired by the first counter at a point in time when the reference angle position detector detects the reference angle position and the measurement value acquired by the second counter at the same point in time; and a recording unit that commences operation for recording the visible image on the optical disk with reference to a point in time when the count value of the first counter and the measurement value of the second counter become equal to the values saved by the saving unit.

(2) The optical disk recording apparatus according to (1), further comprising a correction unit that corrects the measurement value of the second counter saved in the saving unit in such a manner as to prevent occurrence of a response delay in starting operation for recording the visible image on the optical disk in accordance with conditions employed during recording of the visible image, wherein the recording unit records the visible image on the optical disk by use of the count value of the first counter saved in the saving unit and the measurement value of the second counter corrected by the correction unit.

(3) The optical disk recording apparatus according to (1), further comprising a correction unit that corrects the count value of the first counter and the measurement value of the second counter which are saved in the saving unit in such a manner as to prevent occurrence of a response delay in starting operation for recording the visible image on the optical disk in accordance with conditions employed during recording of the visible image, wherein the recording unit records the visible image o the optical disk by use of the count value of the first counter and the measurement value of the second counter which are corrected by the correction unit.

(4) A method of forming a visible image on an optical disk in which one tangential direction of the optical disk is determined as a reference angle position, the method comprising:

holding and rotating the optical disk;

outputting a pulse signal of a frequency responsive to rotation of the rotating unit;

detecting the reference angle position of the optical disk based on an optical signal returned from the optical disk;

counting the number of edges of the pulse during one revolution to acquire a first count value;

measuring a time which elapses from one edge to a next edge of the pulse to acquire a second count value;

saving the first count value at a point in time when the reference angle position is detected and the second count value at the same point in time; and commencing operation for recording the visible image on the optical disk with reference to a point in time when the first count value and the second count value become equal to the saved values.

According to the optical disk recording apparatus of the present invention configured as mentioned above, even when the optical disk, on which a visible image has already been rendered, is taken out of an optical disk drive unit and when the optical disk is inserted again, a visible image can be added to a predetermined position with reference to the existing visible image in a visually-smooth manner.

Even when the number of pulses (FG pulses), per revolution, of a frequency responsive to rotation of the rotating unit is small, a reference angle position can be accurately detected, and rendering can be spliced smoothly.

Moreover, even when there is no necessity of increasing the number of FG pulses, the system can be configured inexpensively.

BRIEF DESCRIPTION OF THE DRAWINGS

FIG. 6 is a flowchart showing the flow of rendering processing.

DETAILED DESCRIPTION OF PREFERRED EMBODIMENTS

Figure 1:
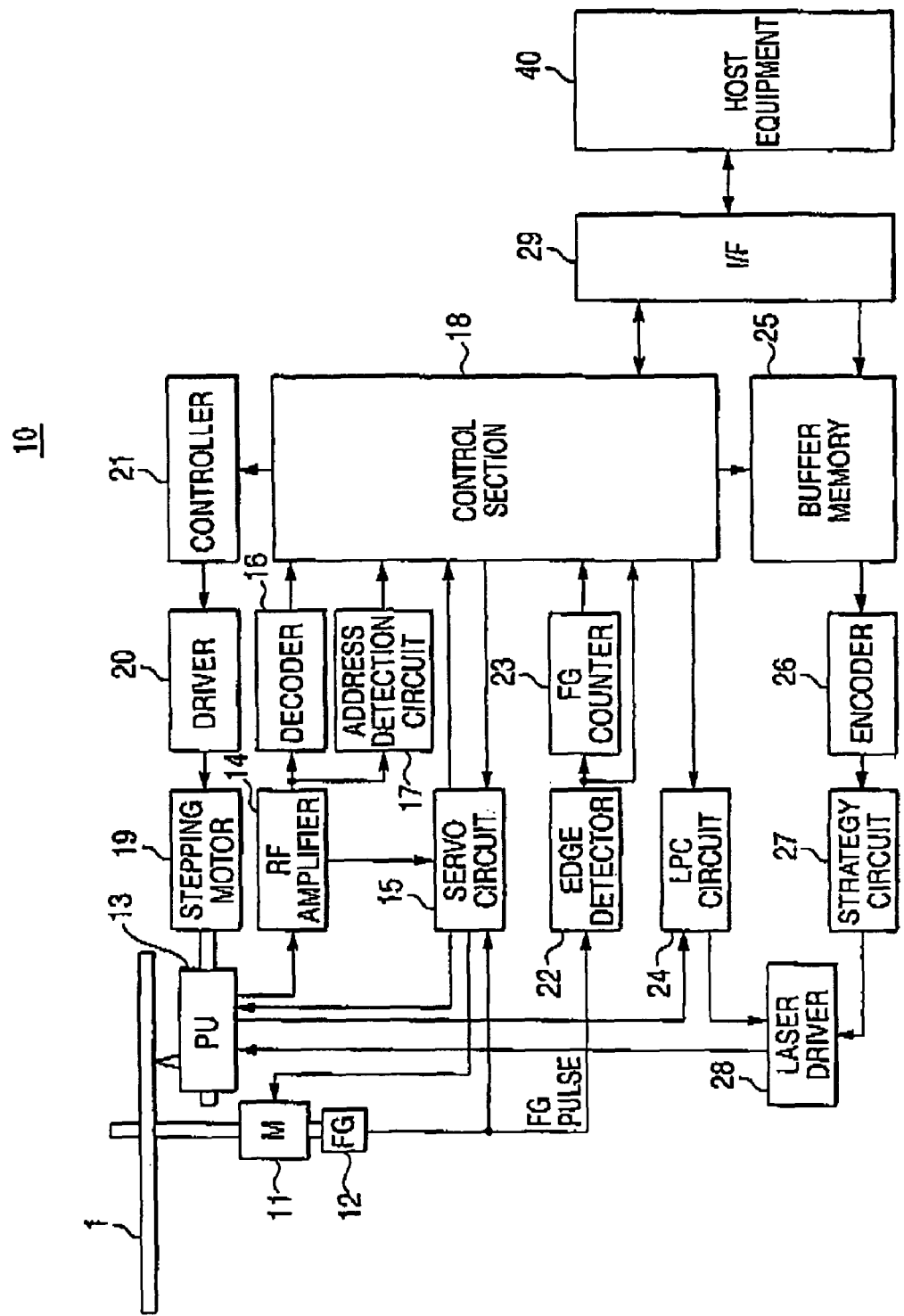
FIG. 1 is a block diagram showing the diagrammatic configuration of an embodiment of an optical disk recording apparatus according to the present invention.

FIG. 1 is a block diagram showing the principal configuration of an embodiment of an optical disk recording apparatus of the present invention.

The optical disk recording apparatus of the present embodiment comprises an optical disk drive unit 10 which records and reproduces data to and from an optical disk 1 and forms a visible image; and host equipment 40, such as a host computer, a backend device, or the like, connected to the optical disk drive unit 10. The host equipment 40 is equipped with an image editing program for editing a visible image to be recorded on the optical disk 1, and a control program for recording data and a visible image on the optical disk 1 and reproducing data from the optical disk 1. The function of the host equipment 40 may be imparted to the optical disk drive unit 10.

The optical disk drive unit 10 includes a spindle motor 11 for rotationally driving the optical disk 1; a frequency generator 12 for outputting an FG pulse of a frequency responsive to the rotational speed of the spindle; an optical pickup 13; an RF amplifier 14; a servo circuit 15; a decoder 16; an address detection circuit 17; a control section 18; a stepping motor 19; a motor driver 20; a motor controller 21; an edge detection circuit 22; an FG counter 23; an LPC (Laser Power Control) circuit 24 for controlling laser power; buffer memory 25; an encoder 26; a strategy circuit 27; a laser driver 28 for driving a laser diode of the optical pickup 13; and an interface circuit 29 for exchanging data among the control section 18, the buffer memory 25, and the host equipment 40.

The spindle motor 11 is a motor for rotationally driving the optical disk 1. In the present embodiment, the spindle motor 11 is assumed to record information and a visible image by means of a CAV (Constant Angular Velocity) system. The spindle motor 11 rotationally drives the optical disk 1 at constant angular velocity.

The frequency generator 12 is a circuit for outputting a pulse signal (an FG pulse) of a frequency responsive to the rotational speed of the spindle (a rotational speed per unit time). A hall sensor is utilized for the frequency generator 12, or the frequency generator 12 outputs a predetermined number of pulses per revolution of the spindle by utilization of counter electromotive force of the spindle motor 1.

When the FG pulse output from the frequency generator 12 does not represent an accurate rotational angle of the spindle for reasons of an error in the mounted position of the hall sensor, electrical variations in a circuit, or the like, highly-accurate pulses can be obtained by means of subjecting the FG pulse to frequency division at an appropriate frequency dividing ratio. For instance, in a case where three FG pulses are generated per revolution of the spindle, when the interval between the FG pulses does not accurately represent an angle of 120°, the FG pulse is divided by three, to thus make the FG pulse accurately responsive to one revolution of the spindle. The FG pulse is multiplied by N (N is a positive integer: e.g., N=8) as necessary, whereby an accurate FG pulse which amounts to N per revolution of the spindle can be generated.

The optical pickup 13 radiates a laser beam onto the optical disk 1 to thus record and reproduce data as well as to render a visible image. A returned-light reception signal (an RF signal having under gone EFM modulation or 8-to-16 modulation), which is generated upon receipt of the light returned at the time of the laser beam having been radiated onto the optical disk 1, is amplified by the RF amplifier 14. The thus-amplified signal is supplied to the servo circuit 15, the decoder 16, and the address detection circuit 17.

On the basis of the signal output from the RF amplifier 14 and the control signal output from the control section 18, the servo circuit 15 controls the rotation of the spindle motor 11 and controls the focus and tracking of the optical pickup 13.

The decoder 16 demodulates the signal that is supplied from the RF amplifier 14 and has undergone EFM modulation or 8-to-16 modulation, and outputs reproduced data.

The address detection circuit 17 extracts a wobble signal component from the signal supplied from the RF amplifier 14; demodulates an ADIP (Address In Pre-Groove) of DVD-based specifications or an ATIP (Absolute Time in Pre-Groove) of CD-based specifications; and detects address information (a positional address). Alternatively, the address detection circuit 17 extracts and detects a sub-code portion from an emboss pit signal.

The stepping motor 19 is a motor for actuating the optical pickup 13 in a radial direction of the optical disk 1. The motor driver 20 rotationally drives the stepping motor 19 in accordance with the control signal supplied from the motor controller 21. Pursuant to an actuation start command, including the actuating direction and the distance of actuation of the optical pickup 13 in the radial direction, issued by the control section 18, the rotor controller 21 generates a pulse signal responsive to the distance of actuation and the actuating direction, and supplies the thus-generated signal to the motor driver 20.

The buffer memory 25 records data (recording data)—which are supplied from the host equipment 40 by way of the interface circuit 29 and are to be recorded onto the optical disk 1—and data pertaining to a visible image to be rendered on the optical disk.

The encoder 26 subjects the recording data read from the buffer memory 25 or data pertaining to a visible image to EFM modulation or 8-to-16 modulation; and outputs the thus-modulated data to the strategy circuit 27. Data pertaining to a visible image are subjected to EFM modulation.

The strategy circuit 27 subjects the signal supplied from the encoder 26 to time-axis correction processing, or the like; and outputs the thus-processed signal to the laser driver 28.

The laser driver 28 drives the laser diode of the optical pickup 13 in accordance with the modulated signal supplied from the strategy circuit 27 and control of the LPC circuit 24.

Although not illustrated herein, a demodulator which is configured so as to output a HIGH value when an EFM pattern of a certain specific pattern is detected and a LOW value at other times is provided in a stage subsequent to the encoder 26 in order to record a visible image. An AND result of the HIGH or LOW value output from the demodulator and the pulse signal output from the strategy circuit 27 is determined and, the thus-determined AND result is supplied to the laser driver 28. Only in the case of the specific EFM pattern, write power and read power are alternately emitted in response to the EFM signal, whereby a recording trace is left on the optical disk. In the case of other EFM patterns, read power is obtained at all times, and hence recording traces are not left on the optical disk. Thus, a visible image, such as an image or a character, can be rendered on an optical disk.

One radial direction is previously set on the optical disk 1 as a reference angle position thereof. A predetermined mark, which is used for representing the reference angle position, is provided on the front surface or reflection layer of the optical disk 1. The predetermined mark can be any mark which can be read by use of optical means such as the optical pickup 13, such as a sub-code or header showing a specific time position, an ATIP or ADIP showing a specific address, or a barcode or another mark formed or printed on the front surface or reflection layer of an optical disk by means of visible image formation processing. This reference angle position shows a physical rotary reference position of the optical disk 1.

The control section 18 of the optical disk drive unit 10 can detect the mark output from the address detection circuit 17 or the decoder 16. When the mark has been detected, the optical pickup 13 is determined to have faced the reference angle position.

When the disk is first subjected to rendering or rendering splicing (a visible image is written once), rendering is initiated in synchronism with this reference angle position. Specifically, the encoder 26 is caused to start encoding the image data to be rendered along the round of the optical disk at the timing where the reference angle position has been detected, to thus start recording a visible image corresponding to the image data.

Regardless of the number of rendering operations, rendering recording operation can be started every time from the same angle position (the reference angle position) on the disk. Even when the optical disk is taken out and again inserted, rendering can be spliced from the predetermined position in a visually-smooth manner with reference to the image having already been written on the optical disk.

The reference position in the present invention comprises a mechanical, rotational reference position (the rotational reference position of the spindle) of the optical disk recording apparatus, a physical, rotational reference position of the optical disk (the reference angle position) and a time reference position used for recording a signal.

The mechanical, rotational reference position of the optical disk recording apparatus is a rotational reference position of the spindle; that is, one of angle positions determined by dividing one revolution by a predetermined number. The mechanical, rotational reference position corresponds to a count value of the FG counter.

The physical, rotational reference position of the optical disk is a previously-described reference angle position.

A chronological reference position for recording a signal is a timing at which data, such as a visible image, are recorded on the optical disk. At a timing of chronological reference position for signal recording, encoding of image data responsive to a visible image to be recorded by the encoder 26 is started.

In the present invention, the physical rotational reference position and the chronological reference position can be caused to coincide with each other by use of angle information showing a rotation time difference between the mechanical, rotational reference position of the optical disk recording apparatus and the physical, rotation reference position (i.e., a reference angle position) of the optical disk.

In order to detect, with high accuracy, a difference (a difference in angles, i.e., a time) between the mechanical, rotational reference position of the optical disk recording apparatus and the physical, rotational reference position (i.e. a reference angle position) of the optical disk, the present invention utilizes an FG counter 23 for counting the FG pulses and an angle counter 30 for measuring a time from a rise or fall of the FG pulse to a rise or fall of the next pulse. The duration of a period of time from the rise or fall of the FG pulse to the timing when the reference angle position has been detected by utilization of both counters.

Figure 2:
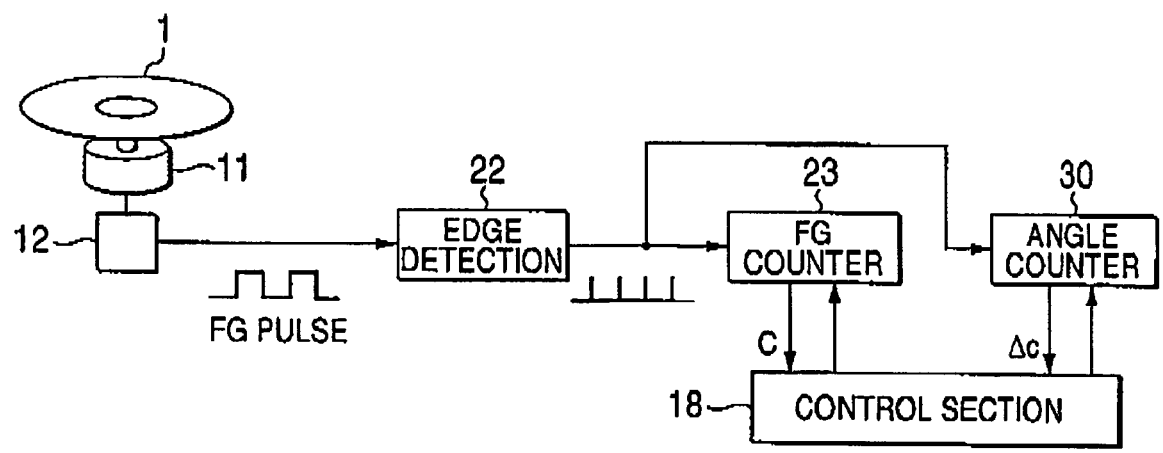
FIG. 2 is a view showing the configuration of the principal section of the optical disk recording apparatus of the present invention.

FIG. 2 is a view for describing the FG counter 23 and the angle counter 30.

As will be described later, the angle counter 30 may be configured as a timer counter by means of hardware. Alternatively, the angle counter 30 may be implemented by means of software processing under control of the control section 18. The FG counter 23 can also be configured of software rather than of hardware.

As mentioned previously, the frequency generator 12 outputs an FG pulse responsive to the rotational speed of the spindle. Here, the number of FG pulses per revolution of the spindle is taken as N (N is an integer: N>0). The edge detection circuit 22 detects both edges; namely, a rise edge and a fall edge, of the FG pulse; and outputs the thus-extracted edge signal to the FG counter 23 which is a counter of hardware logic. The FG counter 23 is configured to be cleared to zero when the count value has reached (2×N). The count value ranges from 0 to (2×N−1). The count value of the FG counter 23 can be read by means of firmware. Moreover, the FG counter 23 is configured so as to be cleared to zero by means of firmware. All the above-mentioned operations may be implemented by software.

Parameters showing angle information are two; C and Δc. Reference symbol "C" denotes a rough angle at which a mark is present on the optical disk 1; and Δc denotes a value responsive to a time from the edge of the FG pulse that is before the angle where the mark is present on the disk.

The FG counter 23 is used for measuring a parameter C.

The FG counter 23 always continues counting operation during revolution of the spindle, and hence continues updating the angle information about the spindle regardless of operation of the firmware. For instance, even when the number of revolutions of the spindle has changed, rotation information is continuously updated. When the mark on the optical disk 1 has been detected, the count value of the FG counter 23 is read by means of firmware, to thus determine C.

Figure 3:
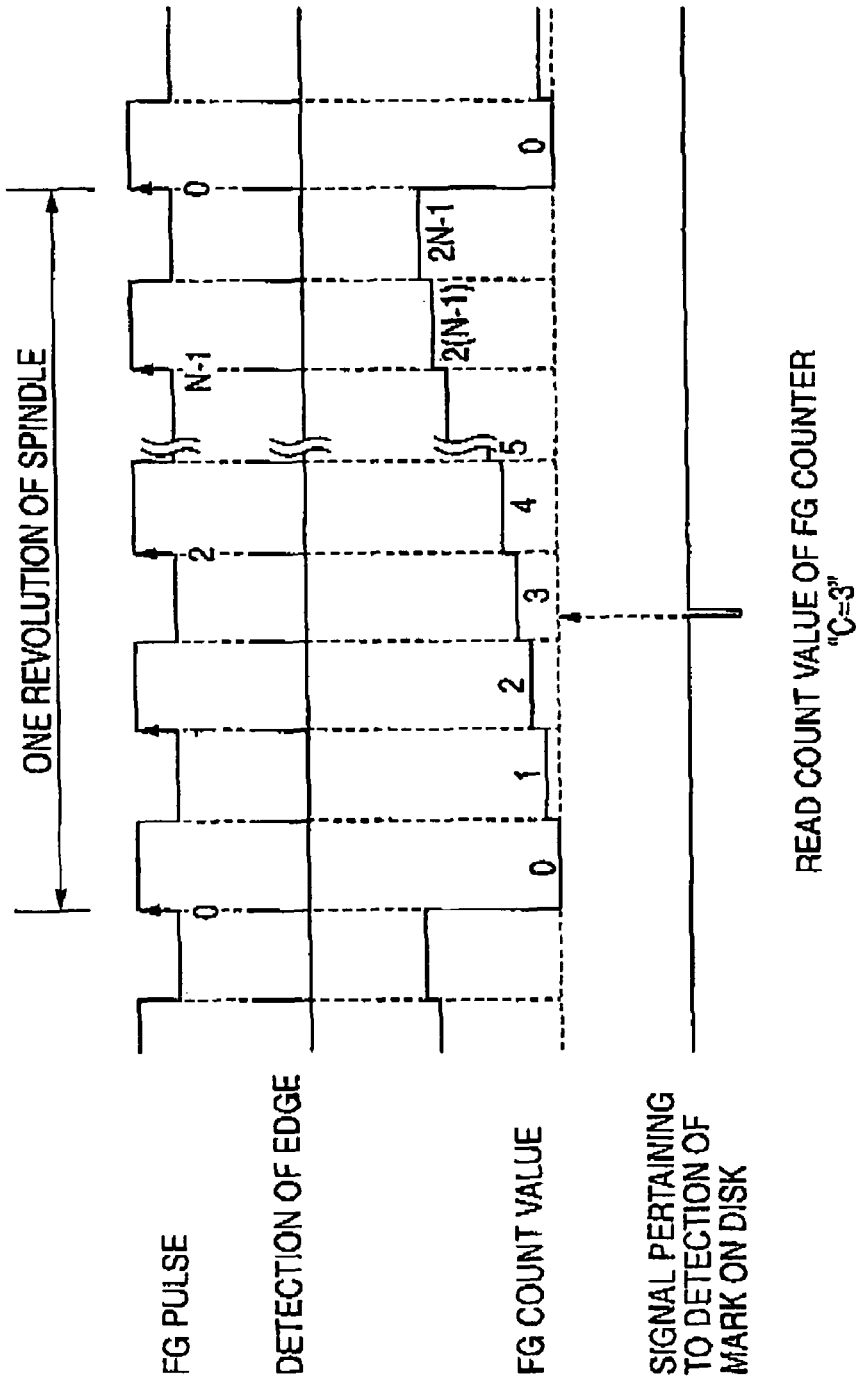
FIG. 3 is a view for describing operation of an FG counter.

FIG. 3 is a view for describing operation of the FG counter 23.

As illustrated, the FG counter 23 counts an edge signal output from the edge detection circuit 22 during one revolution of the spindle. At a timing showing that the mark on the optical disk is detected (a timing when the reference angle position is detected), a count value is read. In the illustrated embodiment, when the mark on the disk has been detected, the count value (C) of the FG counter 23 is taken as 3 (C=3).

The edge signal output from the edge detection circuit 22 is input to the angle counter 30 as well. The angle counter 30 is used for measuring the previously-described parameter $\Delta c$.

Two types of methods: a method employing polling and a method using a timer counter, are available as the method for implementing the angle counter 30.

The method employing polling is a method which uses a loop of software. Namely, when the edge of the FG pulse has been detected, polling (a loop of software) is started. When the mark on the disk has been detected, processing gets out of polling, and the number of loops of polling is taken as $\Delta c$.

The method using a timer counter is a method using a high-frequency, stable oscillator such as a crystal oscillator or the like, and a counter for counting pulses generated by the oscillator (which will be called a "timer counter").

This timer counter is given a structure where the counter is cleared to zero by means of a command from the firmware or the edge of the FG pulse. Moreover, the timer counter is arranged to be able to read a count value from the firmware. When the mark on the disk has been detected during rotation of the spindle, the firmware reads the value of the timer counter. The thus-read value corresponds to $\Delta c$.

Figure 4:
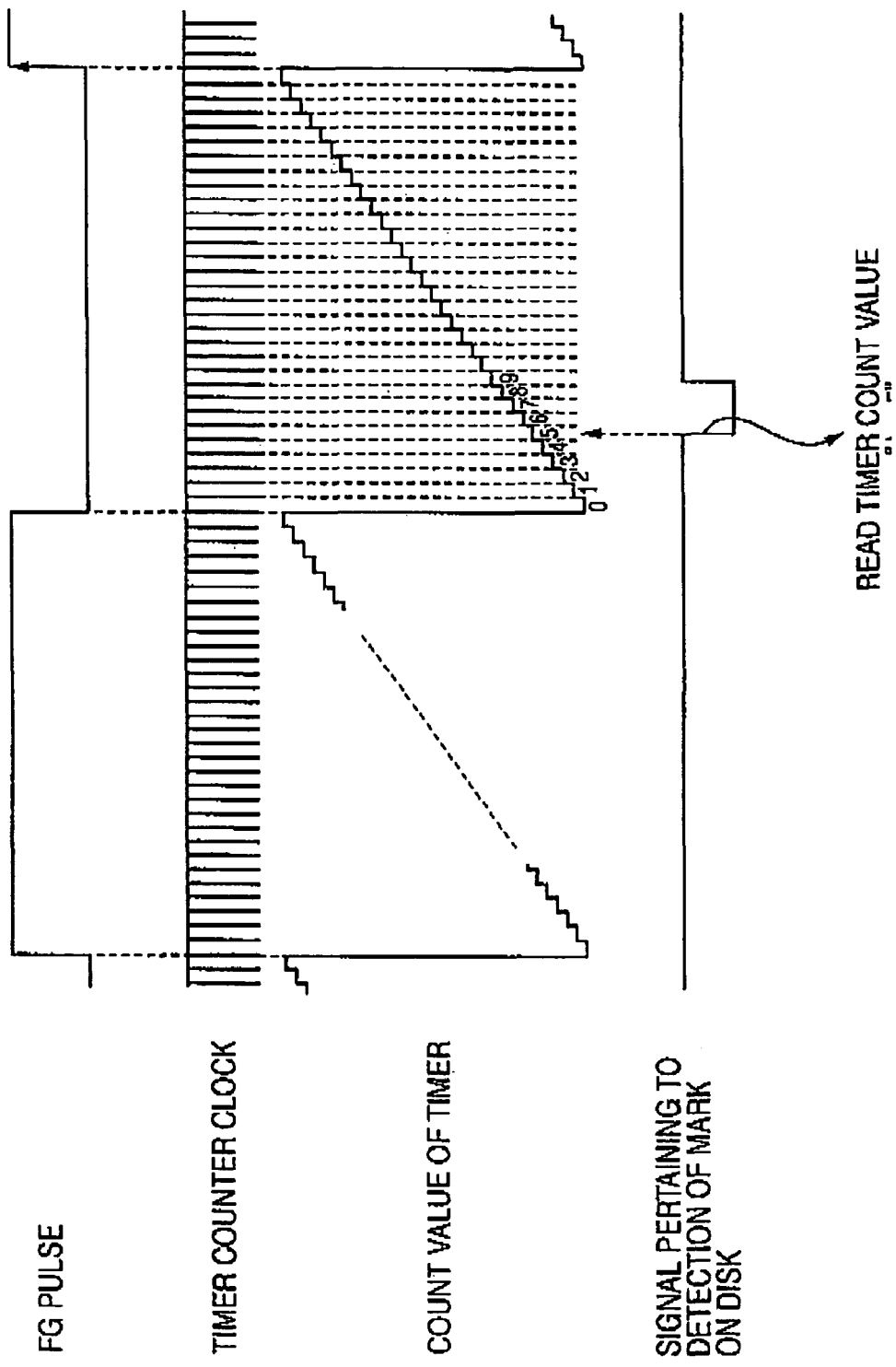
FIG. 4 is a view for describing operation of a timer counter.

FIG. 4 is a view for describing operation of the angle counter. A timer counter is used herein.

As illustrated, the timer counter is a counter which counts a timer counter clock signal of high frequency during a period from the rise (or fall) edge of the FG pulse to the fall (or rise) edge of the same. The timer counter is arranged to be able to read the timer count value ($\Delta c$) acquired at a point in time when the mark on the optical disk 1 has been detected. In the illustrated example, $\Delta c$ is set to 5.

The parameter C and $\Delta c$ determined by the above-mentioned method become values responsive to the reference angle position.

A rough angle is determined by the parameter C, and a precise time difference from C; i.e., the angle of a revolving body, is determined from the parameter $\Delta c$.

However, there may be a case where, when the spindle has come to a standstill, chattering of the FG pulse stemming from stoppage of the spindle or the FG pulse stemming from reverse rotation arises, and the FG count value fails to properly reflect the angle of the disk.

Consequently, the spindle needs to continuously rotate in order to make the value of C effective. Conversely, the value of C is accurate regardless of the number of revolutions of the spindle, unless the spindle is stopped.

In contrast, $\Delta c$ greatly changes according to the number of revolutions of the spindle.

Therefore, when rendering is performed, $\Delta c$ must be corrected according to the number of revolutions employed for rendering except when the number of revolutions of the spindle is equal to that acquired at the time of measurement of $\Delta c$. By means of this correcting operation, a response delay in starting operation for recording a visible image on an optical disk can be prevented.

The thus-corrected $\Delta c$ is taken as $\Delta c'$.

As mentioned previously, when rendering is performed, $\Delta c'$ must have been determined beforehand by means of correcting $\Delta c$.

$\Delta c'$ varies for many factors, such as the number of revolutions of the spindle acquired when $\Delta c$ is measured, the number of revolutions of the spindle acquired when rendering is performed, the oscillation frequency of crystal in the timer counter clock, the processing speed of firmware, a signal processing speed, and the like. For this reason, formulating $\Delta c'$ is difficult.

A test is carried out for each employed system, to thus perform matching. Correspondence between the parameter $\Delta c$ and $\Delta c'$ corresponding to the above-described conditions is formed into a table, and the table is saved as a portion of the firmware in the control section 18.

Rendering is started while the thus-determined parameters C and $\Delta c'$ are taken as references.

The spindle has not stopped since the parameter C was determined. Therefore, processing waits until the count value of the FG counter 23 assumes C.

When the count value of the FG counter 23 has assumed C, counting operation of the angle counter 30 is started at this time. The counting method is not necessarily identical with the method for determining $\Delta c$ (the polling method or the method using a timer counter). The essential requirement is to have performed matching such that a difference between the methods is canceled by correction of $\Delta c$ to $\Delta c'$.

When the count value has assumed $\Delta c'$, the control section 18 issues a rendering start command to the encoder 26. Thereby, even when there exists a time lag from issuance of the rendering start command to actual start of rendering operation, the command is canceled by means of correction of $\Delta c$ to $\Delta c'$.

Depending on the count value of $\Delta c$, there may be a case where C and $\Delta c$ are corrected. For instance, when the count value of $\Delta c$ is in the neighborhood of "0," there may be the case of C=C−1, $\Delta c'=\Delta c max-$(the amount of correction−$\Delta c$).

As mentioned above, rendering from the accurate reference angle position can be implemented.

Figure 5:
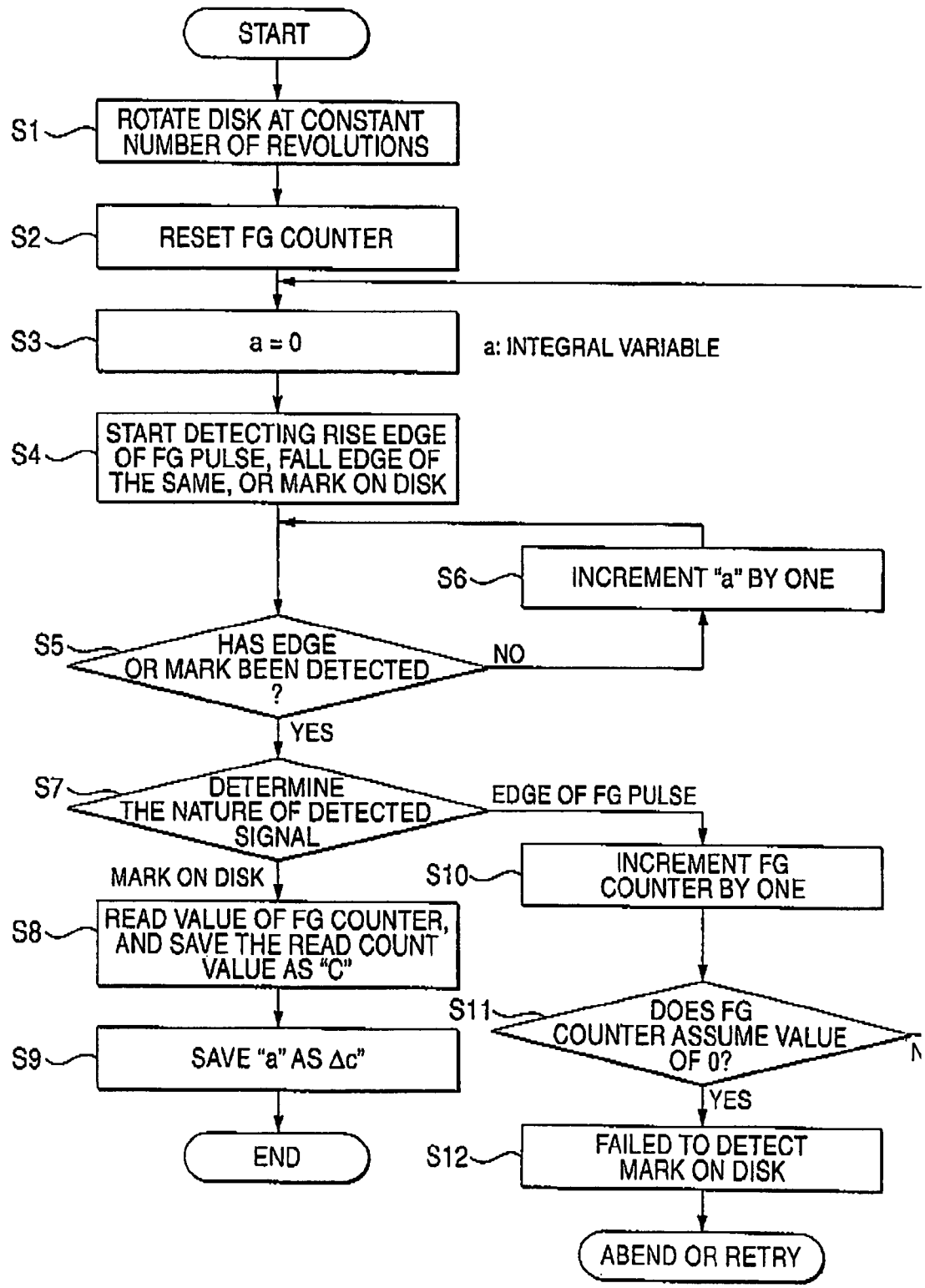
FIG. 5 is a flowchart showing the flow of reference angle position detection processing.

FIG. 5 is a flowchart showing the flow of processing for detecting the reference angle position. In this embodiment, there is shown a case where the above-described polling method is used as the angle counter 30. The FG counter 23 is also implemented by means of software processing which is under control of the control section 18.

First, the control section 18 rotates the loaded optical disk 1 at a constant number of revolutions (step S1). When the optical disk 1 has been rotated at the given number of revolutions, the count value of the FG counter 23 is reset (step S2). A predetermined variable "a" is reset to "0" (a=0). This variable "a" corresponds to the count value of the angle counter 30.

Detection of the rise or fall edge of the FG pulse or detection of a mark on the disk is initiated (step S4). The variable "a" is incremented until the rise or fall edge of the FG pulse or a mark on the disk is detected (steps S5, S6). The number of commands included in the loop is set such that the loop becomes the previously-described loop of software and such that the cycle of the loop becomes a predetermined cycle.

When any of the rise edge of the FG pulse, the fall edge of the same, and the mark on the disk has been detected, the nature of the detected signal is determined (step S7).

When the mark representing the reference angle position on the optical disk has been detected, the count value of the FG counter is read, and the thus-read count value is saved as the previously-described parameter C (step S8). The value of the variable "a" is saved as the parameter $\Delta c$ (step S9).

Meanwhile, when the edge of the FG pulse (the rise edge or the fall edge) has been detected, the count value of the FG counter is incremented by one (step S10). A determination is made as to whether or not the count value of the FG counter has become 0 or 2N. When the count value has assumed 0 or 2N, the spindle has rotated once without detecting the mark on the disk. Accordingly, the program abends or makes a retry as detection of the mark on the disk having ended in failure (step S12). When the count value of the FG counter has assumed neither 0 nor 2N, processing returns to step S3, where the variable "a" is reset to 0. Then, processing proceeds to step S4.

As mentioned above, the count value (C) of the FG counter 23 acquired at the time of detection of the reference angle position and the count value ($\Delta c$) of the angle counter 30 acquired at the same time are acquired, and the thus-acquired count values are saved in the storage section which is located in the control section 18.

Next, visible image rendering processing for recording a visible image on a disk surface of the optical disk 1 will now be described by reference to FIG. 6. Before rendering operation is performed, a parameter $\Delta c'$, which has been corrected in accordance with conditions such as the number of revolutions of the spindle acquired during rendering operation, is assumed to be determined by a program for performing rendering operation and by reference to the table pertaining to correspondence between the previously-described parameters $\Delta c$ and $\Delta c'$.

When rendering has been commenced, the control section 18 rotates the optical disk 1 at a given number of revolutions (step 521). The number of revolutions does not need to be identical with that acquired during detection of the reference angle position shown in FIG. 5. However, revolution of the optical disk 1 is assumed not to be stopped.

Next, a preparation for recording a visible image is made (step S22). Thereby, image data pertaining to a visible image to be rendered are transmitted from the host equipment 40 and stored in the buffer memory 25.

Detection of an edge of the FG pulse is commenced. When the edge of the FG pulse has been detected (steps S23, S24), a determination is made as to whether or not the count value of the FG counter 23 is equal to the saved value of C (step S25). When the count value is not equal to the saved value, processing returns to step S23, where detection of the next edge is awaited.

When the count value of the FG counter 23 is equal to the saved value of C, the value of an integral variable "a" is reset to 0 (step S26). As in the case shown in FIG. 5, the variable "a" corresponds to the count value of the angle counter 30. The variable "a" is incremented until the value of "a" assumes the corrected parameter $\Delta c'$ (step S27, S28). The cycle of this loop is set so as to become equal in length to that acquired in the case shown in FIG. 5.

When the variable "a" has become equal to the value of $\Delta c'$, a rendering start command is output (step S29). Thus, the encoder 26 starts encoding the image data stored in the buffer. Thus, the image data to be recorded during revolution are taken as corresponding encoding data. As mentioned previously, the laser beam is emitted from the laser driver 28 at corresponding illuminance, whereupon the visible image is rendered.

What is claimed is:

1. An optical disk recording apparatus for forming a visible image on an optical disk in which one tangential direction of the optical disk is determined as a reference angle position, the optical disk recording apparatus comprising:
   an irradiating unit that irradiates a laser beam to the optical disk;
   a rotating unit that holds and rotates the optical disk;
   an angle signal output unit that outputs a pulse signal of a frequency responsive to rotation of the rotating unit;
   a reference angle position detector that detects the reference angle position of the optical disk based on an optical signal reflected by the optical disk;
   a first counter that counts the number of edges of the pulse signal during one revolution as a count value;
   a second counter that measures a time which elapses from one edge to a next edge of the pulse signal as a measurement value;
   a saving unit that saves the count value acquired by the first counter at a point in time when the reference angle position detector detects the reference angle position and the measurement value acquired by the second counter at the same point in time; and
   a recording unit that commences operation for forming the visible image on the optical disk with reference to a point in time when the count value of the first counter and the measurement value of the second counter become equal to the values saved by the saving unit.

2. The optical disk recording apparatus according to claim 1, further comprising a correction unit that corrects the measurement value of the second counter saved in the saving unit in such a manner as to prevent occurrence of a response delay in starting operation for forming the visible image on the optical disk in accordance with conditions employed during recording of the visible image,
   wherein the recording unit forms the visible image on the optical disk by use of the count value of the first counter saved in the saving unit and the measurement value of the second counter corrected by the correction unit.

3. The optical disk recording apparatus according to claim 1, further comprising a correction unit that corrects the count value of the first counter and the measurement value of the second counter which are saved in the saving unit in such a manner as to prevent occurrence of a response delay in starting operation for forming the visible image on the optical disk in accordance with conditions employed during forming of the visible image,
   wherein the recording unit forms the visible image on the optical disk by use of the count value of the first counter and the measurement value of the second counter which are corrected by the correction unit.

4. A method of forming a visible image by an optical disk apparatus on an optical disk in which one tangential direction of the optical disk is determined as a reference angle position, the method comprising:
   irradiating a laser beam to the optical disk;
   holding and rotating the optical disk;
   outputting a pulse signal of a frequency responsive to rotation of the rotating unit;
   detecting the reference angle position of the optical disk based on an optical signal reflected by the optical disk;
   counting the number of edges of the pulse signal during one revolution to acquire a first count value;
   measuring a time which elapses from one edge to a next edge of the pulse signal to acquire a second count value;
   saving the first count value at a point in time when the reference angle position is detected and the second count value at the same point in time; and
   commencing operation for forming the visible image on the optical disk with reference to a point in time when the first count value and the second count value become equal to the saved values.

5. The optical disk recording apparatus according to claim 1, wherein a mark representing the reference angle position is previously provided on the optical disk, and when the laser beam is irradiated on the optical disk and the mark is included in the optical signal reflected by the optical disk, the reference angle position is detected.

6. The method according to claim 4, wherein a mark representing the reference angle position is previously provided on the optical disk, and when the laser beam is irradiated on the optical disk and the mark is included in the optical signal reflected by the optical disk, the reference angle position is detected

.

* * * * *